United States Patent [19]
Serizawa

[11] Patent Number: 5,408,304
[45] Date of Patent: Apr. 18, 1995

[54] IMAGE FORMING APPARATUS HAVING A PRE-PAPER-FEED FUNCTION

[75] Inventor: Yoji Serizawa, Kawasaki, Japan

[73] Assignee: Canon Kabushiki Kaisha, Tokyo, Japan

[21] Appl. No.: 851,687

[22] Filed: Mar. 11, 1992

[30] Foreign Application Priority Data

Mar. 13, 1991 [JP] Japan .................. 3-048086

[51] Int. Cl.⁶ .................................. G03G 21/00
[52] U.S. Cl. .................. 355/309; 355/204; 355/314; 358/300; 395/111
[58] Field of Search ........... 355/308, 309, 316, 208, 355/209, 204; 271/156; 358/300, 296; 346/160, 108, 134; 395/111, 116

[56] References Cited

U.S. PATENT DOCUMENTS

| | | | |
|---|---|---|---|
| 4,586,813 | 5/1986 | Ide ........................ | 355/309 |
| 4,992,882 | 2/1991 | Ikenoue et al. ........ | 358/300 |
| 5,294,966 | 3/1994 | Shiokawa ............... | 346/160 X |

Primary Examiner—A. T. Grimley
Assistant Examiner—Shuk Y. Lee
Attorney, Agent, or Firm—Fitzpatrick, Cella, Harper & Scinto

[57] ABSTRACT

In an image forming apparatus having a pre-paper-feed function to previously convey a paper to a predetermined position before a print request, after a device for generating a pre-paper-feed requests has generated the pre-paper-feed request, the pre-paper-feed request can be made invalid.

18 Claims, 14 Drawing Sheets

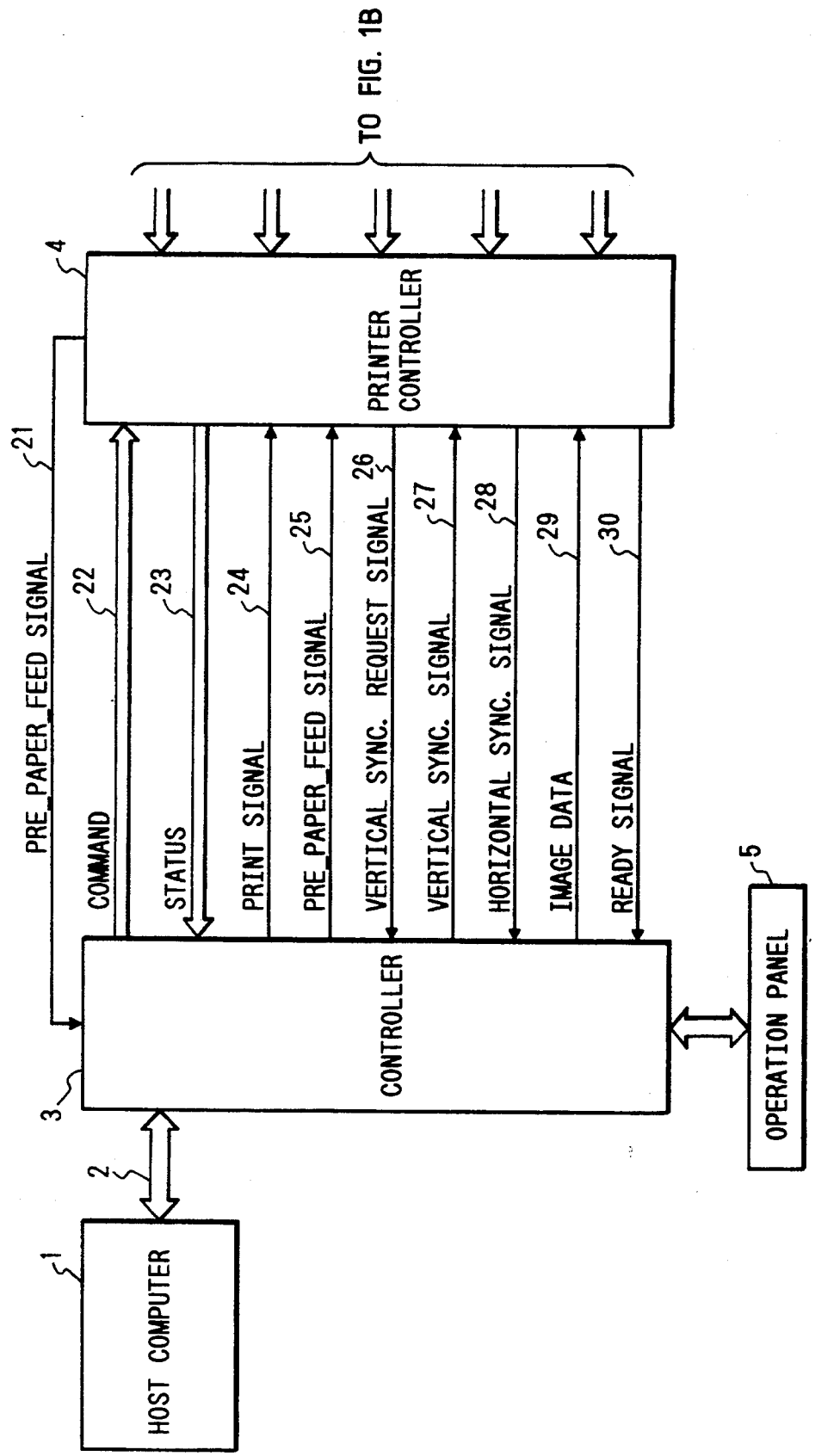

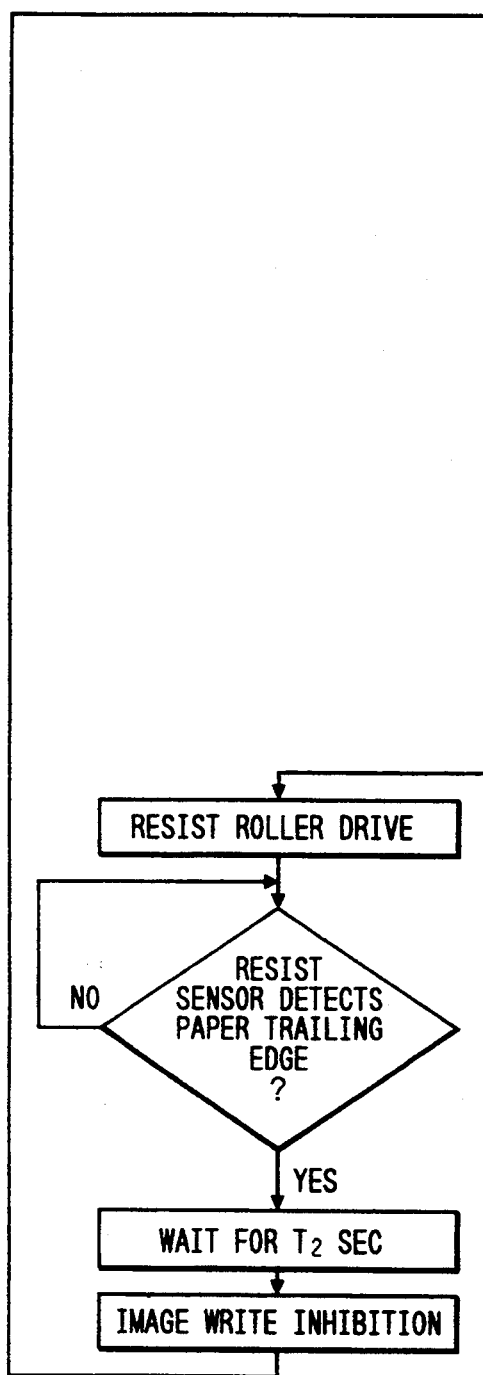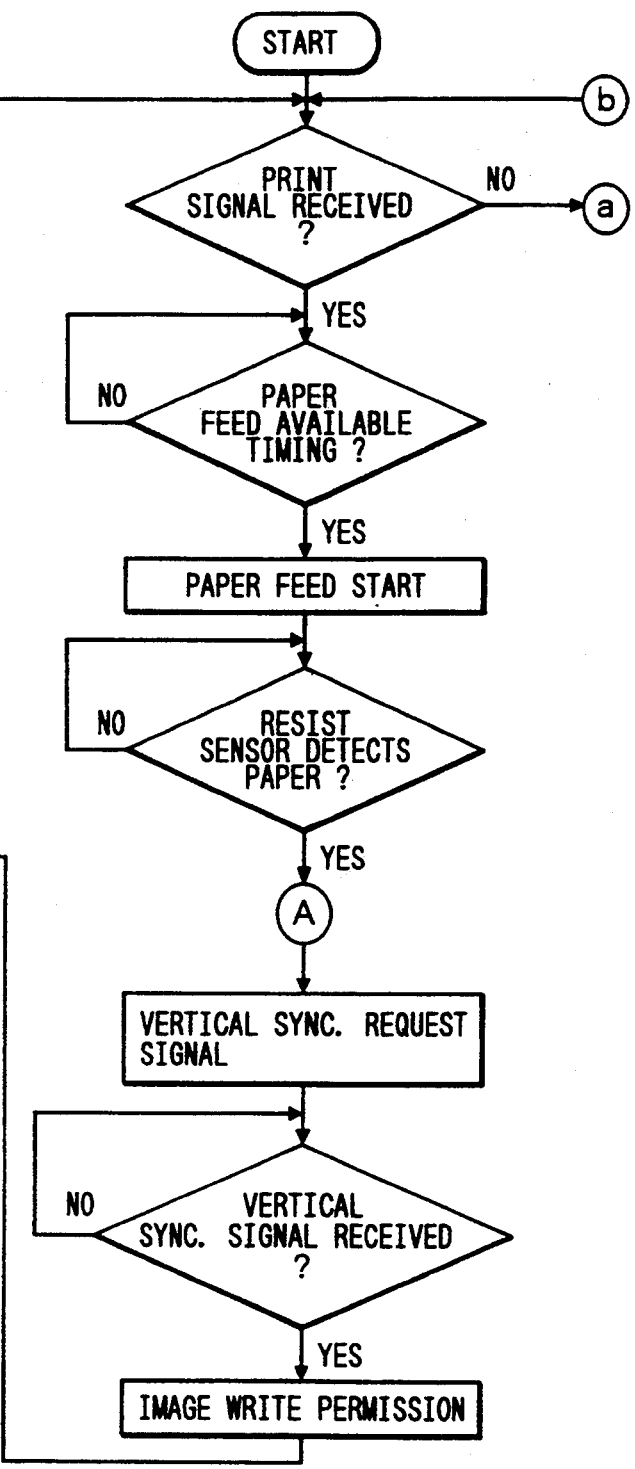

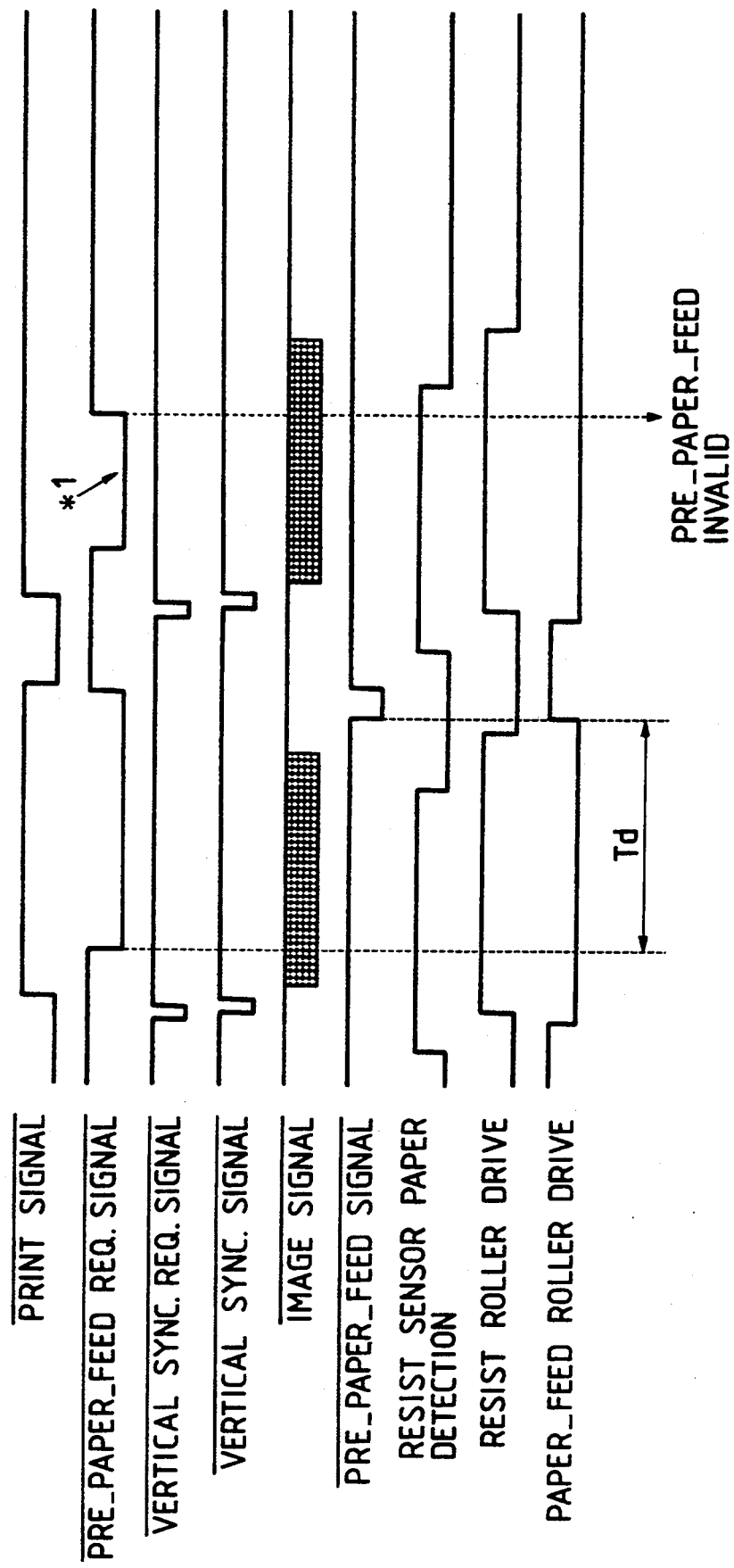

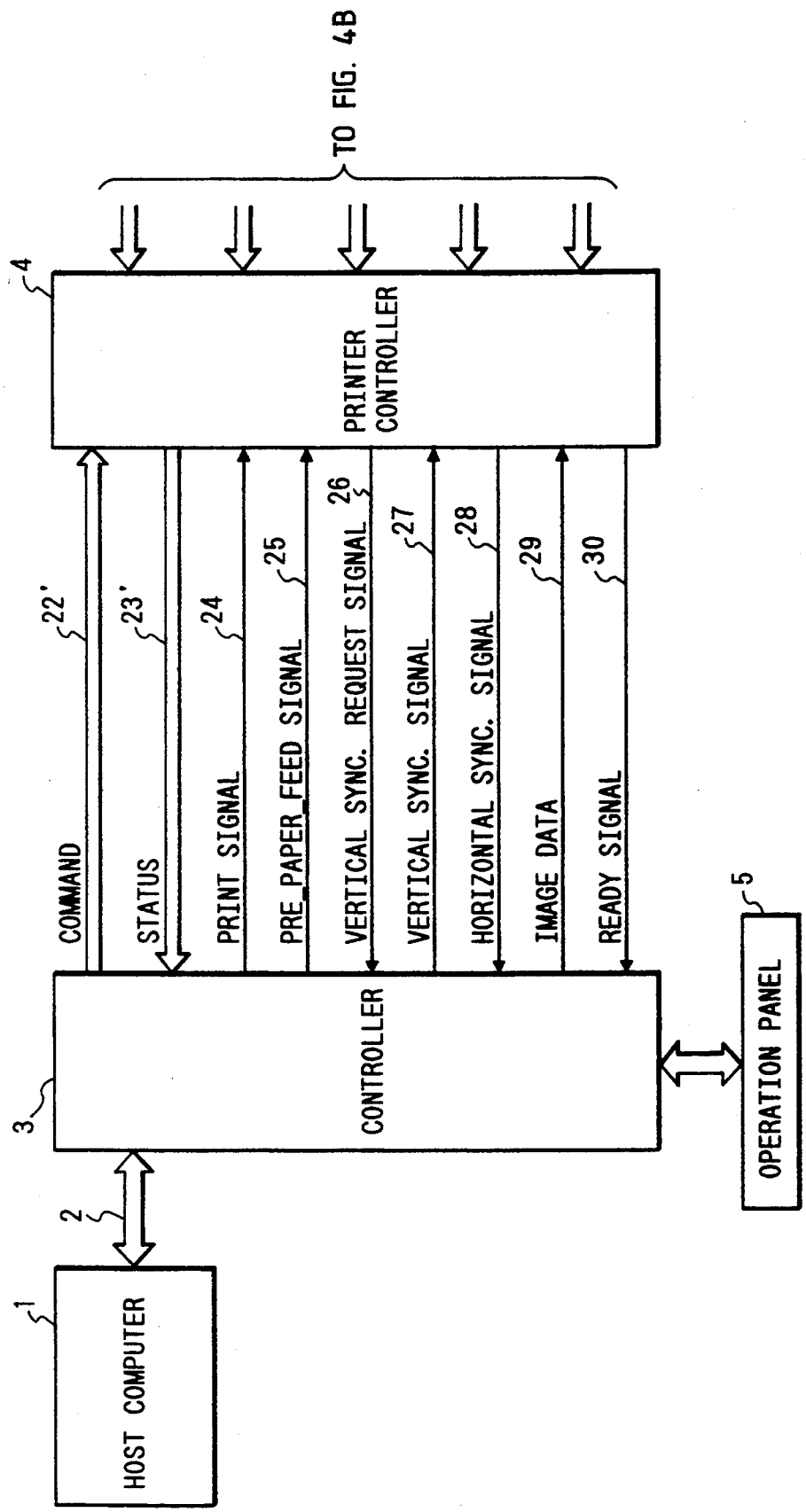

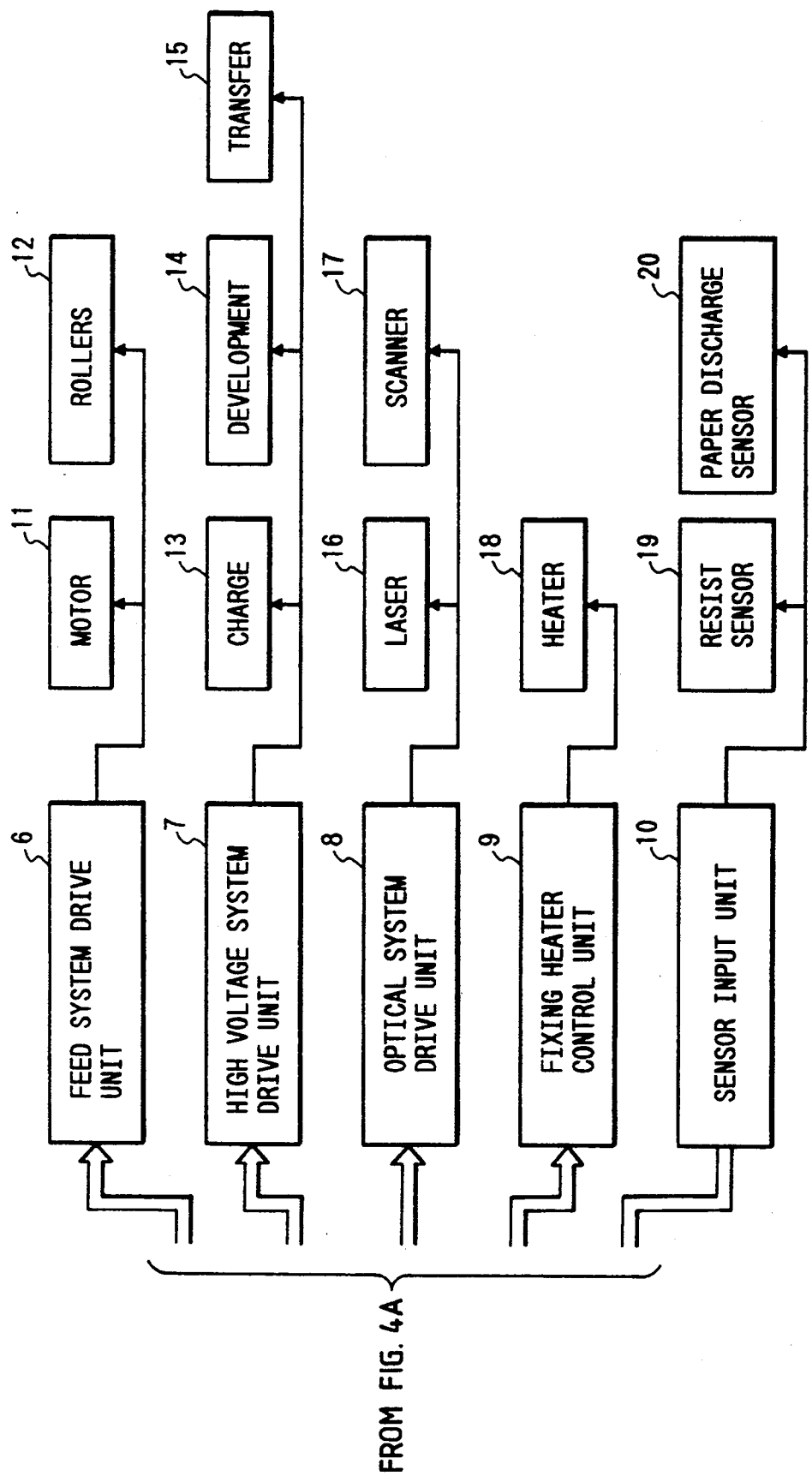

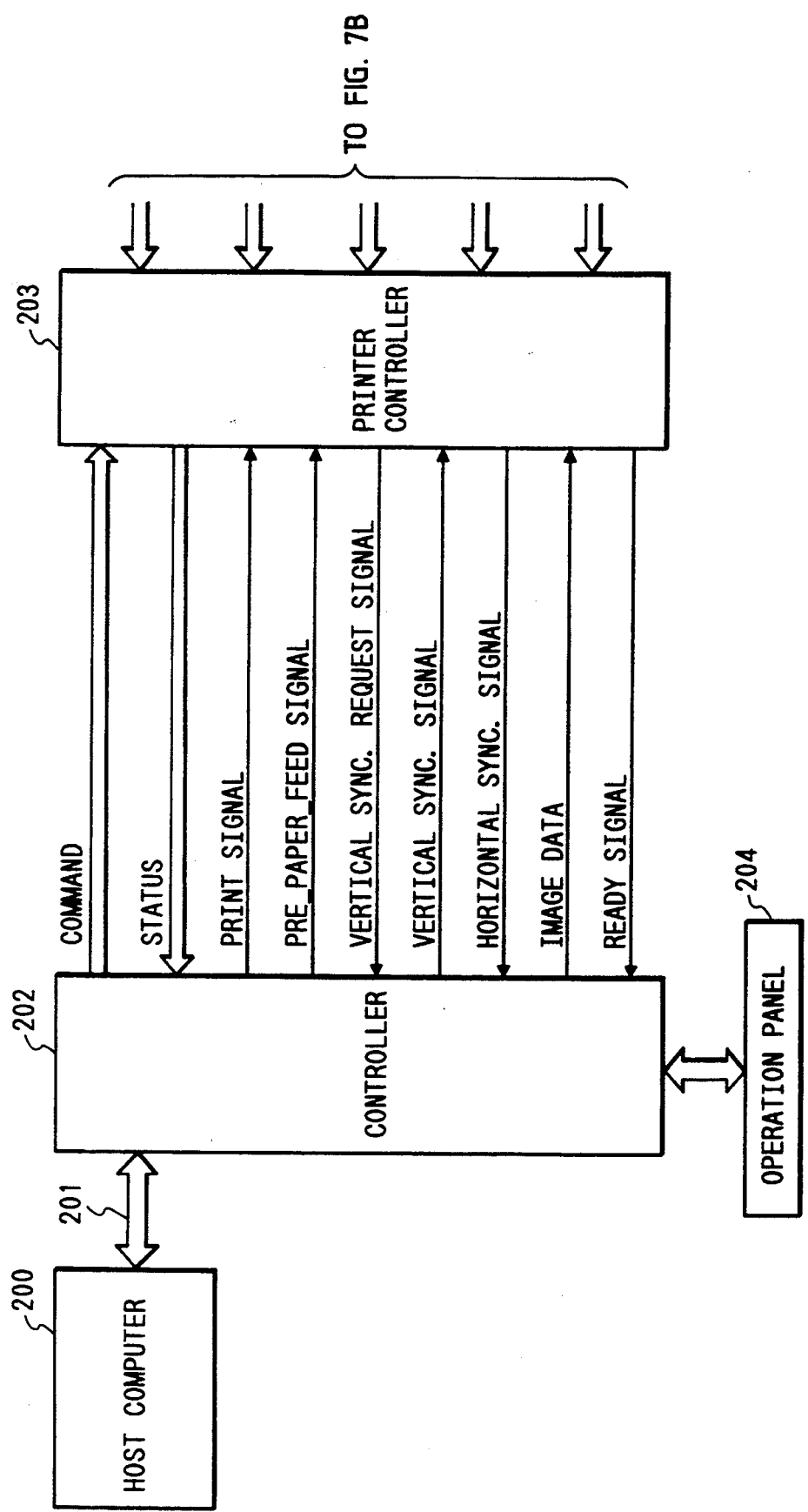

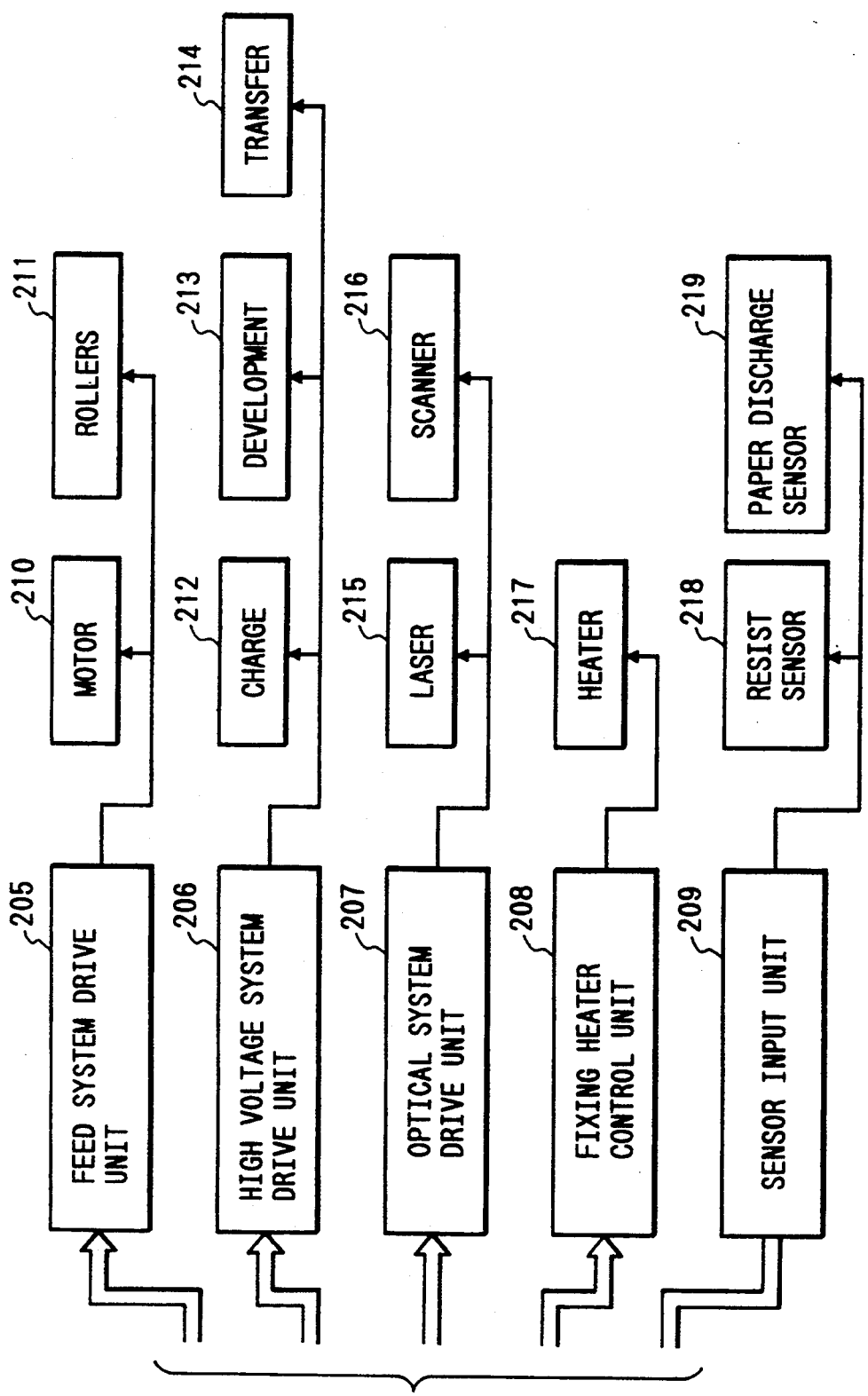

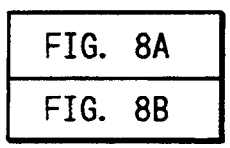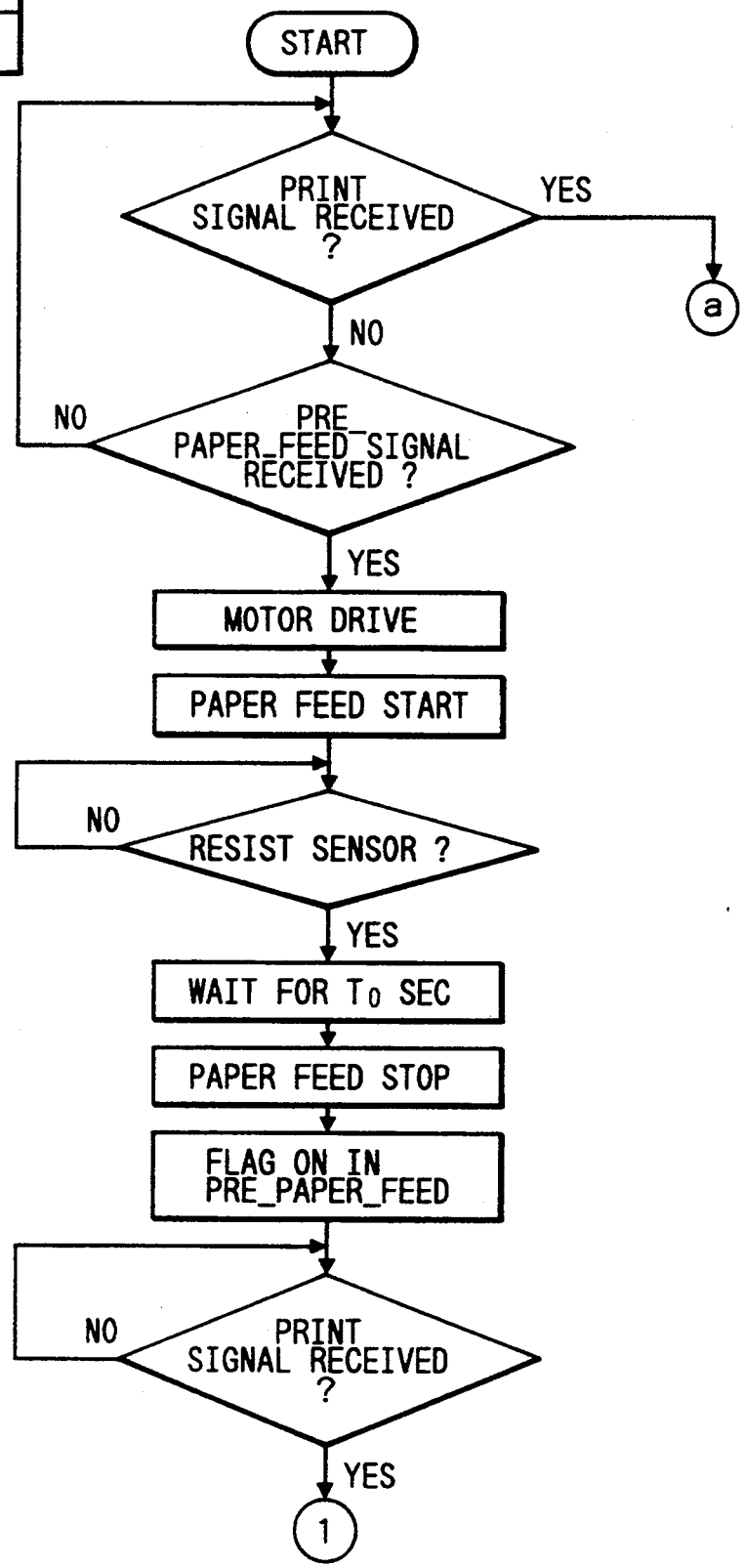

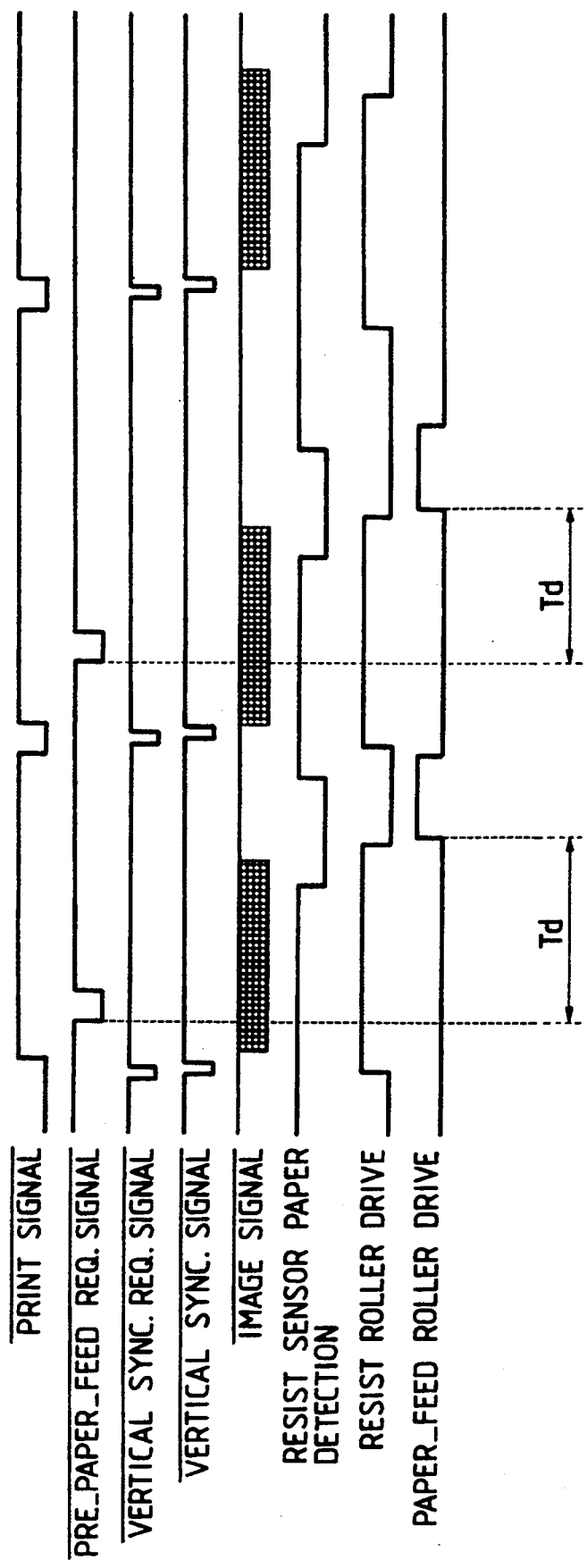

IMAGE FORMING APPARATUS HAVING A PRE-PAPER-FEED FUNCTION

BACKGROUND OF THE INVENTION

1. Field of the Invention

The invention relates to an image forming apparatus having a pre-paper-feed function to previously feed a paper to a predetermined position on a conveying path before a print request.

2. Related Background Art

The inventor of the present application has already proposed an image forming apparatus having a pre-paper-feed function with a construction as shown in FIG. 6. The function of each section will now be described hereinbelow.

Reference numeral 100 denotes a photo sensitive drum as an electrostatic latent image holding member; 101 a charging roller to uniformly charge the drum 100; 102 a developing device to develop an electrostatic latent image formed on the drum 100 by a light beam 104; 103 a copy transfer roller to copy transfer the developed toner image onto a paper; 105 a semiconductor laser to generate the light beam 104; 106 a scanner to scan the light beam 104 onto the drum 100; 107 an optical lens system to adjust the light beam so as to form a light spot on the drum 100. As shown in FIG. 7 a controller 202 is used for transmitting a command to a printer control unit 203, and for reading out internal data as a status from the printer control unit 203. The controller 202 also sends a print start request or a pre-paper-feed request to the printer control unit 203 and further transmits and receives a sync signal to synchronize the output timing of the image data and the conveyance timing of the paper in the printer. The controller 202 is provided in either the printer or the host computer. Reference numeral 203 denotes the printer control unit 1 which transmits and receives control signals to/from the controller 202 and also controls the timings to drive/stop each mechanism section in FIG. 6 and reads out input information from each sensor. Reference numeral 204 denotes an operation panel, which is used for the user to input various kinds of setting modes of the printer (for instance, the setting of a margin in an image region and the like). The operation panel 204 is generally used in an off-line state (state in which the communication line 202 with the host computer is disconnected).

Reference numeral 205 denotes a feed system drive unit to drive/stop a drive/stop motor 210 of various rollers 211 on the basis of an instruction from the printer control unit 203. Reference numeral 206 denotes drum surface; 108 a paper cassette in which papers to be printed are enclosed; 109 a paper feed roller to take out the papers from the cassette 108 one by one and convey to the conveying path; 110 a resist paper presence/absence sensor to detect the presence or absence of the paper on the conveying path; 111 resist rollers for correcting the oblique movement by abutting the front edge of the paper to the resist rollers and for synchronizing the timing to write image data onto the photo sensitive drum and the timing to convey the paper; 112 a fixing roller to fuse and fix the toner image, which has been copy transferred to the paper, onto the paper; 113 a discharge paper presence/absence sensor to confirm that the paper is discharged from the fixing roller; and 114 paper discharge rollers to discharge the paper.

FIG. 7 shows a block diagram of a control system to control an electrophotographic printer having a mechanism section as mentioned above.

Reference numeral 200 denotes a host computer to transmit image code data formed by the operation of the user or the like on the outside of a printer to the controller 202 as parallel or serial data through a communication line 201. Reference numeral 202 denotes the controller for developing the image code data sent from the host computer 200 and converting it into image data using a high voltage system drive unit to drive/stop a charging unit 212, a developing unit 213, and a copy transfer unit 214 on the basis of an instruction from the printer control unit 203; 207 indicates an optical system drive unit to drive/stop a laser 215 and a scanner 216 on the basis of an instruction from the printer control unit 203; 208 a fixing heater control unit to drive/stop a fixing heater 217 on the basis of an instruction from the printer control unit 203; and 209 a sensor input unit for reading information from a resist sensor 218 and a paper discharge sensor 219 and providing the information to the printer control unit 203.

FIG. 8 is a flowchart showing a sequence for a pre-paper-feed from the stand-by of the printer control unit to the printing of one page.

The printer is first held in a waiting state for a print signal from the controller 202. When no print signal is received, the presence or absence of a pre-paper-feed request from the controller is checked. When the pre-paper-feed request is received, the motor is driven and, thereafter, the paper feed operation is started. A check is subsequently made to see if the paper has reached the position of the resist sensor or not. After the sensor has detected the front edge of the paper, the apparatus waits for $T_0$ seconds (time which is required until the front edge of the paper of a predetermined amount abuts on the resist rollers) and the paper feed operation is stopped. The motor is also stopped at this time point and the apparatus enters the print signal waiting state. When the print signal is received, the motor is again driven and the scanner and each high voltage system is raised. When the rotational speed of the scanner motor reaches a predetermined value, the paper has already previously been fed, so that the presence or absence of the paper of at the resist sensor is checked. Since the pre-paper feed has already been executed here, when no paper exists at the position of the resist sensor at this time point, an abnormality process (jam process or the like) is performed. When the paper exists at the position of the sensor, a vertical sync request signal is generated to the controller 202. When the controller 202 receives the vertical sync signal after that, it permits the image writing operation onto the photo sensitive drum and drives the resist rollers. When the paper discharge sensor detects the trailing edge of the paper, the apparatus waits for $T_i$ seconds (time which is required until the paper is completely discharged from the apparatus). Then, the high voltage is dropped, the scanner motor is stopped, the motor of the roller drive system is stopped, and the printing process is stopped.

The above description relates to the case of the single printing mode. FIG. 9 shows a timing chart for the printing operation by the pre-paper-feed request signal and the print signal in the case of a continuous printing mode. The pre-paper-feed request signal is generated as a pulse signal having a predetermined width. In the continuous printing mode, the controller can previously feed a necessary number of papers, which will be printed subsequently during the printing operation of a certain paper. However, the printer control unit 203 feeds the paper while keeping an interval of a predetermined amount for the preceding paper. Therefore, there is a case where it takes a short time until the paper is actually fed after the controller generates the pre-paper-feed request signal (such a time is shown by $T_d$ in the diagram). Hitherto, there are executed processes such that when the printer control unit once receives the pre-paper-feed request signal, the paper feed operation is certainly executed at a predetermined timing.

In the conventional apparatus mentioned above, however, there is a processing system such that in response to the pre-paper-feed request, which has once been generated from the controller, the pre-paper-feed is certainly executed for the printer at a predetermined timing.

For instance, therefore, when the user operates the operation panel connected to the controller, the user sets the apparatus into the off-line state and executes an operation such as a mode change or the like. However, when the off-line setting operation is performed after the controller generated the pre-paper-feed request, the controller cannot make such a request invalid. Accordingly, the apparatus waits until the printer feeds the paper. Thereafter, the controller generates a print signal and waits for the completion of the printing operation and must cope with the off-line operation by the user. Such an operation to make the pre-paper-feed invalid is considered to be executed not only in the case of the off-line operation but also the cancelling operation of the image data, which is performed from the host computer side to the controller or the like. That is, according to the conventional technique, when the pre-paper-feed request, which has once been generated from the controller, needs to be made invalid due to some cause, such a request cannot be made invalid. Thus, a problem occurs from a viewpoint of the operating efficiency of the user as mentioned above when such a process to make the pre-paper-feed request invalid is impossible.

SUMMARY OF THE INVENTION

It is an object of the invention to solve the foregoing problems.

Another object of the invention is to improve an image forming apparatus having a pre-paper-feed function.

Still another object of the invention is to provide an image forming apparatus which can improve a throughput of the image forming operation by previously conveying a sheet to a predetermined position before a print request is generated and can also improve an operating efficiency of the apparatus.

According to the invention, by providing the function to make invalid a pre-paper-feed request which has once been generated from a controller, the pre-paper-feed request can be made invalid for a period of time which is required until the paper feed operation is actually executed after a printer received the pre-paper-feed request or the like, thereby increasing a flexibility of various processes of the controller.

The above and other objects, features, and advantages of the present invention will become apparent from the following detailed description and the appended claims with reference to the accompanying drawings.

BRIEF DESCRIPTION OF THE DRAWINGS

FIG. 3 is a timing chart showing an example of the continuous printing operation of the first embodiment;

FIG. 4 which is comprised of FIG. 4A and FIG. 4B, is a block diagram showing a construction of the second embodiment of the invention;

FIG. 7 which is comprised of FIG. 7A and FIG. 7B, is a block diagram of a control system of the apparatus shown in FIG. 6;

FIG. 9 is a timing chart showing an example of the continuous printing operation in the conventional technique.

DETAILED DESCRIPTION OF THE PREFERRED EMBODIMENTS

Preferred embodiments of the present invention will be described in detail hereinbelow with reference to the drawings.

[First embodiment]

Figure 1B:
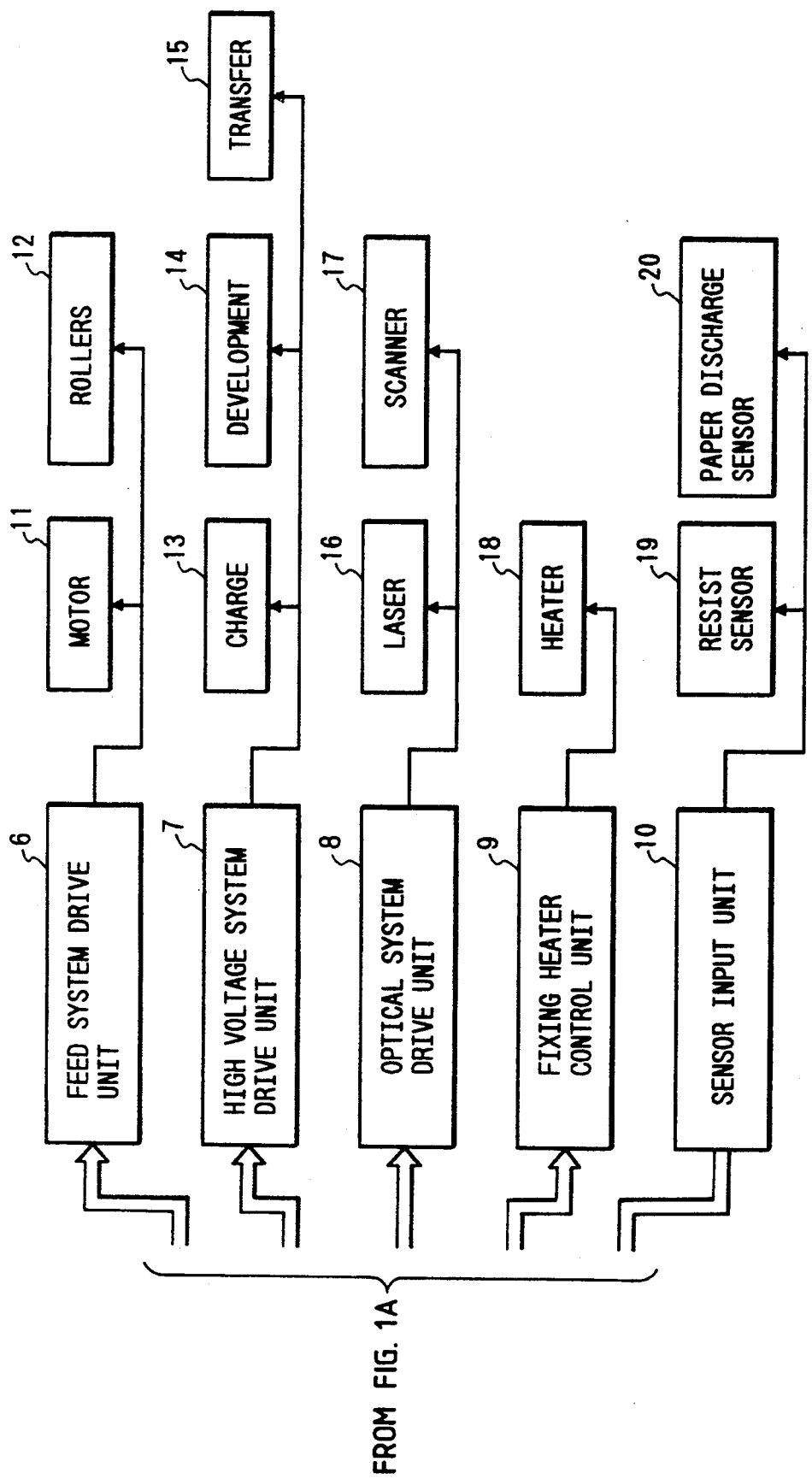
FIG. 1 which is comprised of FIG. 1A and FIG. 1B, is a block diagram showing a construction of the first embodiment of the invention.

FIG. 1 shows a block diagram of a printer control system according to the first embodiment of the invention. A printer mechanism section is similar to that in the conventional apparatus shown in FIG. 6.

Since the function of each block is partially similar to that shown in FIG. 7, only characteristic points of the embodiment will be described. In the embodiment, a pre-paper-feed signal 21, which is sent from a printer control unit 4 to a controller 3, is provided between the controller 3 and the printer control unit 4. The pre-paper-feed signal 21 is set to "true" when the printer control unit 4 receives a pre-paper-feed request from the controller 3 and the paper feed operation is actually started. By subsequently receiving a print signal, the signal 21 is set into "false". In the conventional apparatus, the pre-paper-feed request is defined as a pulse signal. In the embodiment, however, the pre-paper-feed request is handled as a signal which is held until the print signal is set into "true".

Figure 2B:
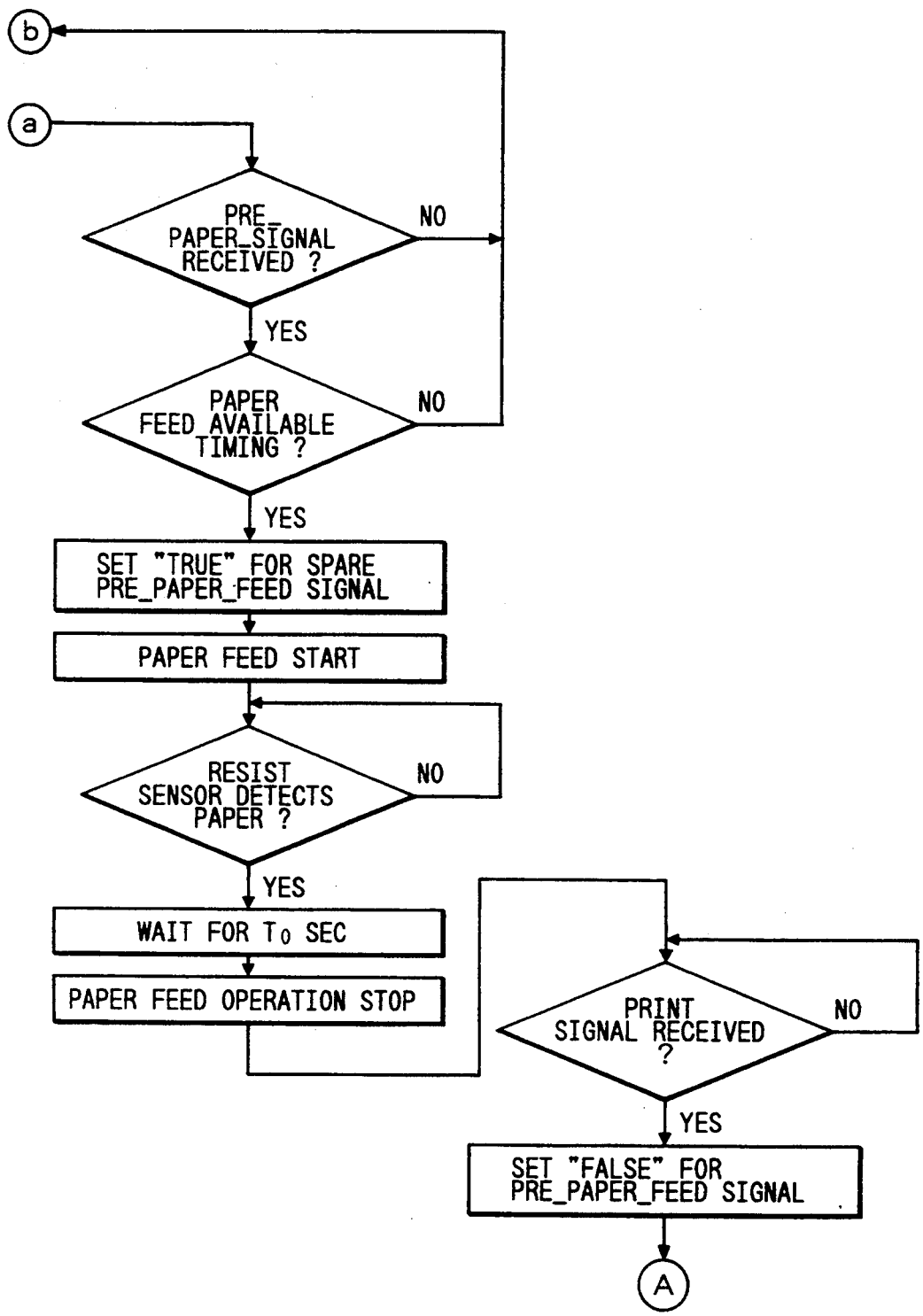
FIG. 2 which is comprised of FIG. 2A and FIG. 2B, is a flowchart for explaining the operation of the first embodiment.

FIG. 2 shows a flowchart for a print sequence in the continuous printing mode of the printer control unit 4 in the above case.

In the continuous printing mode, it is now assumed that the motor, scanner, and high voltage system have already risen. First, during the printing of a certain page, the print signal and pre-paper-feed request for the next paper are checked. When the print signal is received first, the ordinary printing operation is executed. When the pre-paper-feed request is received first, however, the apparatus waits without performing the paper feed operation until the trailing edge of the preceding page reaches a predetermined position. In the above waiting state, the apparatus doesn't merely wait for the paper feed timing but waits while executing an initial process, namely, checking the print signal and pre-paper-feed request signal. Therefore, when the print signal is set into "true" during the waiting operation of the paper feed timing, the pre-paper-feed request, which has already been set into "true", is cancelled and the printing operation can be started. When the controller sets the pre-paper-feed request into "false" for a period of time during which the apparatus waits for the pre-paper-feed timing while checking the print signal and pre-paper-feed request, the printer cancels the pre-paper-feed request which has already been received and can enter the ordinary state to wait for the print signal and pre-paper-feed request.

When the printer is set into a state in which the paper can be fed from the state to wait for the pre-paper-feed timing, the printer generates the pre-paper-feed signal of "true" to the controller. The actual paper feed operation is executed. After that, a check is made to see if the resist sensor has detected the front edge of the paper or not. When the resist sensor detects the front edge of the paper, the apparatus waits for $T_0$ seconds (time which is required until the paper of a predetermined amount abuts on the resist rollers) and stops the paper feed operation. After that, the apparatus is set into the print signal waiting state. When the print signal is received, a vertical sync request signal in the ordinary printing operation is generated. The subsequent operations are similar to those in the conventional apparatus.

FIG. 3 shows a timing chart for the above processes. The timing chart shows the ordinary printing process of the first and second pages by the pre-paper-feed and the print signal and the process in the case of making the pre-paper-feed request of the third page invalid. As shown in the timing chart, a time shown by $T_d$ in FIG. 3 exists until the printer actually starts the paper feed operation after the controller generated the pre-paper-feed request. By providing the processing function shown in FIG. 2, the period of time $T_d$ can be set to a period of time during which the pre-paper-feed request can be made invalid. To make invalid the signal *1 shown in FIG. 3 and generated as a pre-paper-feed request of the third page, the controller sets the generated pre-paper-feed request into "false" by referring to the pre-paper-feed signal which is generated from the printer when it is set to "φ". Consequently, the printer operates as if no pre-paper-feed request was generated before.

[Second embodiment]

Figure 5:
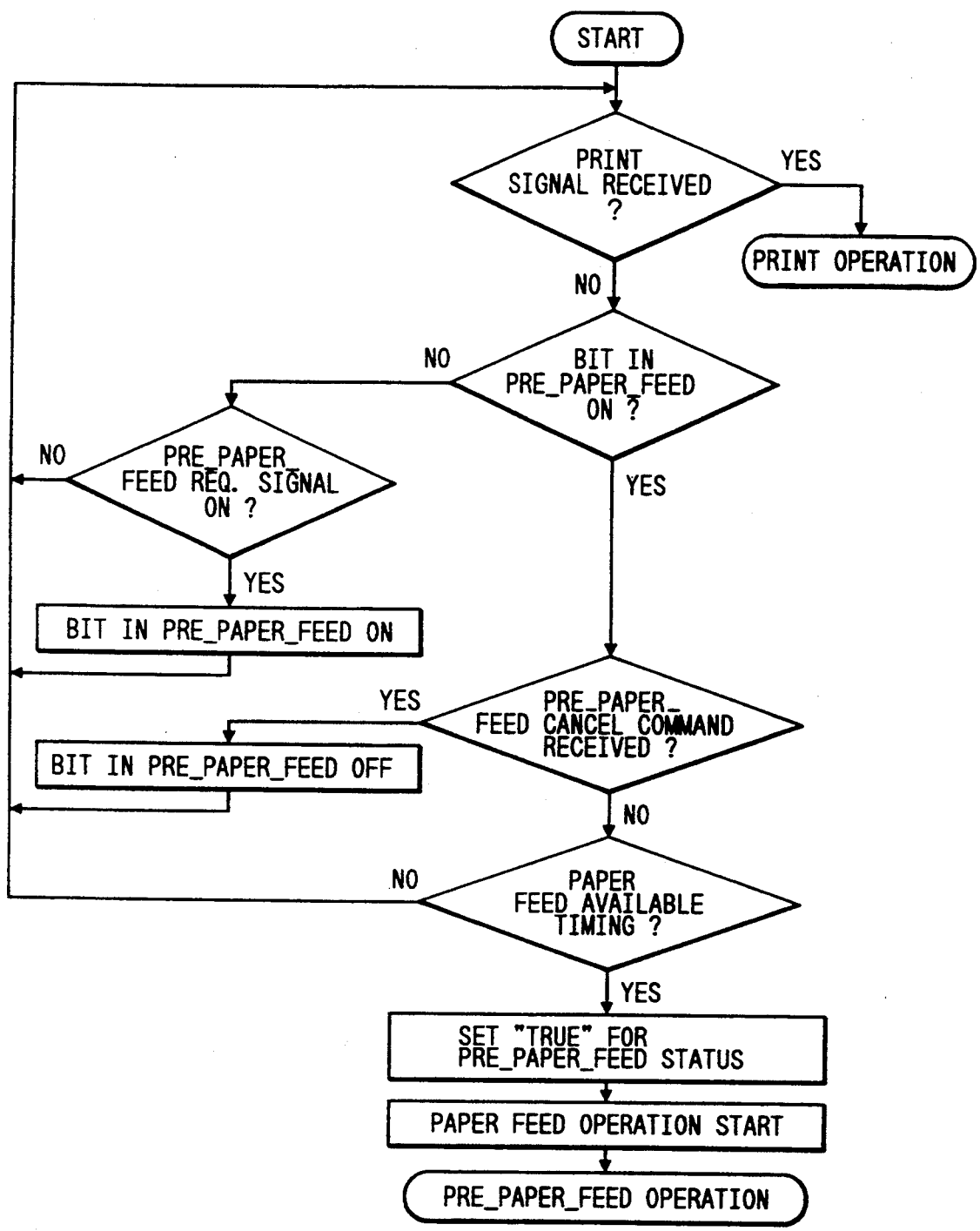
FIG. 5 is a flowchart for explaining the operation of the second embodiment.
Figure 6:
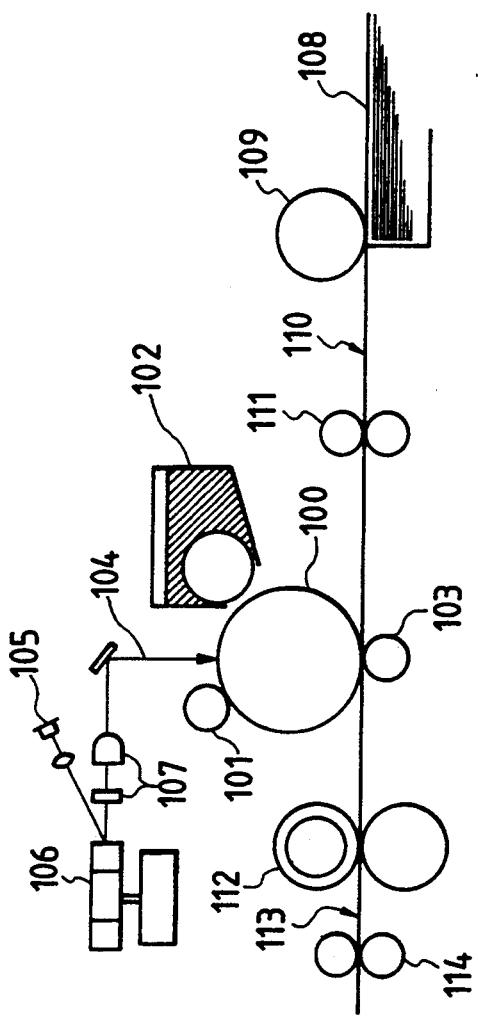
FIG. 6 is a diagram showing a schematic construction of an image forming apparatus of the electrophotographic system.
Figure 8B:
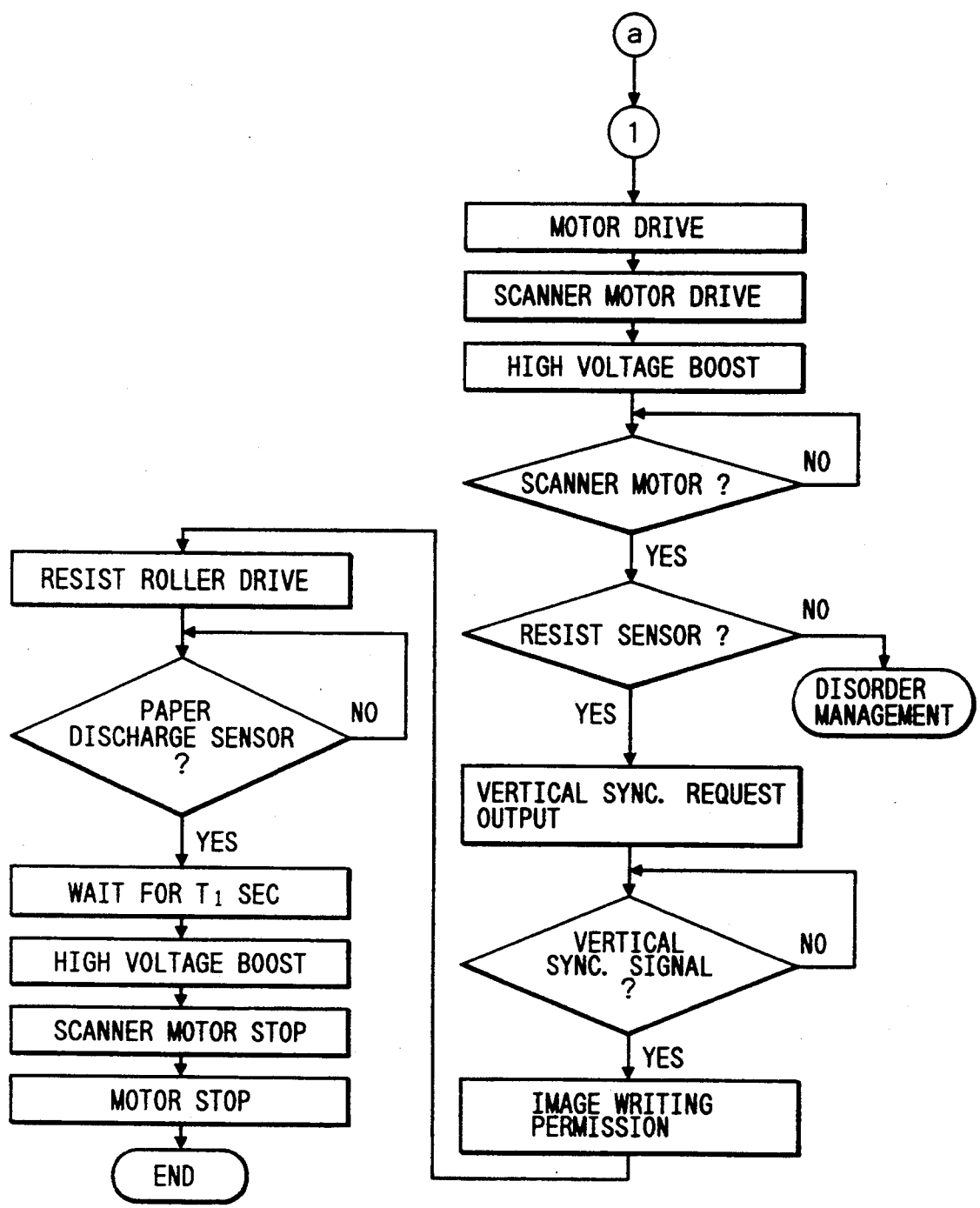
FIG. 8 which is comprised of FIG. 8A and FIG. 8B, is a flowchart for explaining the operation of an image forming apparatus of a conventional technique.

FIGS. 4 to 6 show the second embodiment of the invention.

FIG. 4 is a control block diagram and its fundamental construction is substantially similar to that of the first embodiment. In the second embodiment, however, the pre-paper-feed signal is omitted, a pre-paper-feed status 23' having the same content as the pre-paper-feed signal is provided in a status, and the controller has a command to request such a status and a command 22' to make invalid the pre-paper-feed request which has once been generated. That is, although the pre-paper-feed request is generated as a pulse signal as shown in the conventional apparatus, the process to make the pre-paper-feed request invalid is performed according to the communication content of the command-status between the controller and the printer control section.

FIG. 5 is a flowchart showing a recognizing processing section of the print signal and the pre-paper-feed request in the printer control unit. Since the pre-paper-feed request in the embodiment is a pulse signal, after the printer control unit recognizes the pulse signal, it is necessary to hold the information of the recognized pulse signal into a memory provided in the printer control unit. Such information is a pre-paper-feed bit. The pre-paper-feed bit is set into "true" for a period of time until the next print signal is received after the printer control unit recognized the pre-paper-feed request. After the controller generated the pre-paper-feed request pulse, the controller transmits a pre-paper-feed cancel command to the printer control unit 4 where it is necessary to make the pre-paper-feed request invalid for the period of time of the status "φ" while referring to the pre-paper-feed status. The printer control unit sets the internal pre-paper-feed bit into "false" and is returned to the mode to check the print signal and the pre-paper-feed request. Consequently, even the pre-paper-feed request which has once been recognized can be made invalid.

As a compound type of the above first and second embodiments, a similar result can be also obtained even in the case where the pre-paper-feed request is a level signal which is held up to a timing just before the print signal and the pre-paper-feed is detected via the status as a method of detecting the pre-paper-feed.

Although the pre-paper-feed request is transmitted by using another signal line different from the lines of the other signals in the first and second embodiments, it is also possible to include a pre-paper-feed request signal onto another signal line by recognizing a signal on the vertical sync signal line in the period of time during which the print signal is set into "true" as a vertical sync signal and by recognizing a signal on the vertical sync signal line for a period of time during which the print signal is set into "false" as a pre-paper-feed request signal.

As described above, by providing the function to indicate the execution of the pre-paper-feed and the function to make the pre-paper-feed request invalid for a portion between the controller and the printer control unit, in the case where the pre-paper-feed is not performed in the off-line process, cancelling operation of the reception data, or the like which requires emergency in the controller, such an emergency process can be promptly executed. The generation of a blank paper, which is undesirable for the user at that time, is not performed. An integrated operating efficiency of the printer can be remarkably improved.

The present invention is not limited to the foregoing embodiments but many modifications and variations are possible within the spirit and scope of the appended claims of the invention.

What is claimed is:

1. An image forming apparatus comprising:
   means for receiving, prior to a print request signal and from an image data source, a predetermined signal instructing said apparatus to feed a sheet to a predetermined position;
   means for receiving the print request signal;
   means for forming an image on the sheet fed from the predetermined position in response to the print request signal; and
   means for outputting an identifying signal identifying a time after which the predetermined signal instructing the apparatus to feed the sheet to the predetermined position cannot be cancelled.

2. An image forming apparatus according to claim 1, wherein said apparatus is capable of feeding the sheet to the predetermined position for image formation on a next page in response to the predetermined signal, prior to completion of image formation on a current page.

3. An image forming apparatus according to claim 1, wherein said predetermined signal is a continuous signal to be maintained until at least a print request signal is outputted.

4. An image forming apparatus according to claim 3, wherein when the maintained state of said predetermined signal is released at a time when the predetermined signal is cancelable, said apparatus cancels the instruction of the predetermined signal.

5. An image forming apparatus according to claim 1, wherein said predetermined signal is a strobe signal in the form of a pulse and said apparatus further comprises means for storing said predetermined signal.

6. An image forming apparatus according to claim 5, further comprising means for receiving a predetermined command sent from the image data source and for cancelling the instruction from the predetermined signal, wherein when the predetermined command is received at a time when the predetermined signal is cancelable, said apparatus cancels the instruction of the predetermined signal.

7. An image forming apparatus according to claim 1, wherein said apparatus outputs statuses of said apparatus to the image data source and outputs said identifying signal as one of the statuses.

8. An image forming apparatus according to claim 1, wherein said predetermined signal is sent via a signal line different from signal lines used for transmission of other signals.

9. An image forming apparatus according to claim 1, wherein said predetermined signal is sent via a signal line used for transmission of a vertical sync signal.

10. An image forming apparatus according to claim 1, further comprising the image data source.

11. An image forming apparatus according to claim 1, wherein said image forming means forms the image by an electrostatic recording system.

12. An image forming apparatus according to claim 1, further comprising means for reserving a plurality of sheets, wherein said apparatus feeds a sheet from said reserving means to the predetermined position on the basis of the predetermined signal.

13. An image forming apparatus according to claim 12, wherein when the print request signal is received without receiving the predetermined signal, said apparatus feeds a sheet from said reserving means in response to the print request signal.

14. An image forming apparatus according to claim 1, wherein said predetermined position is a stop position at a registration roller.

15. An image forming apparatus according to claim 1, further comprising the image data source.

16. An image forming apparatus according to claim 15, wherein said image forming apparatus cancels the instruction of the predetermined signal by stopping the sending of the predetermined signal when the image forming apparatus is set into an off-line state at the identified time, after said image data source outputs the predetermined signal.

17. An image forming apparatus according to claim 15, wherein the image data source converts code data sent from an external host computer into bit map data.

18. An image forming apparatus according to claim 17, wherein said image forming apparatus cancels the predetermined signal by stopping the sending of the predetermined signal when a print cancel command is received from the external host computer at the identified time, after said image data source outputs the predetermined signal.

* * * * *

UNITED STATES PATENT AND TRADEMARK OFFICE
CERTIFICATE OF CORRECTION

PATENT NO. : 5,408,304
DATED : Apr. 18, 1995
INVENTOR(S) : Yuji Serizawa

It is certified that error appears in the above-indentified patent and that said Letters Patent is hereby corrected as shown below:

<u>Column [57] ABSTRACT</u>,
   Line 4, "requests" should read --request--.

<u>Column 2</u>,
   line 45, "of" should be deleted.

<u>Column 6</u>,
   line 9, "recognized" should read --recognizes--; and
   line 10, "generated" should read --generates--.

Signed and Sealed this

Eighth Day of August, 1995

Attest:

BRUCE LEHMAN

*Attesting Officer*      *Commissioner of Patents and Trademarks*